J. LEFKOWITZ.
TROLLEY WHEEL.
APPLICATION FILED MAY 2, 1918.

1,332,130.

Patented Feb. 24, 1920.

WITNESSES
Frederick Diehl.
Geo. H. Beeler.

INVENTOR
J. Lefkowitz.
BY
ATTORNEYS

UNITED STATES PATENT OFFICE.

JOSEPH LEFKOWITZ, OF SCHENECTADY, NEW YORK, ASSIGNOR OF ONE-HALF TO THOMAS FRANCIS FAHEY, OF SCHENECTADY, NEW YORK.

TROLLEY-WHEEL.

1,332,130.   Specification of Letters Patent.   Patented Feb. 24, 1920.

Application filed May 2, 1918. Serial No. 232,102.

*To all whom it may concern:*

Be it known that I, JOSEPH LEFKOWITZ, a subject of the Emperor of Austria-Hungary, and a resident of Schenectady, in the county of Schenectady and State of New York, have invented a new and Improved Trolley-Wheel, of which the following is a full, clear, and exact description.

This invention relates to trolley wheels or the like and has particular reference to wheels intended for use upon electric wires for the conveyance of electricity for power and lighting purposes.

Among the objects of the invention is to provide a wheel having side flanges adapted to move with respect to each other or the hub.

Another object of the invention is to provide a trolley wheel with side flanges flexibly connected to the hub whereby provision is made for either or both of the flanges to be automatically tilted in any direction so as to bring the plane thereof oblique to the axis of the hub.

A still further object of the invention is to provide a trolley wheel which by reason of the flexibility of the connecting means for the side flanges is much less likely to leave the wire than the usual solid wheels, at crossovers or turns in the roadway.

A still further object of the invention is to provide a trolley wheel having renewable flanges, the flanges being connected to the hub in such a manner as to reduce to a considerable extent the tendency of the wheel to become excessively hot in practice.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same part in the several views, and in which—

Figure 1:
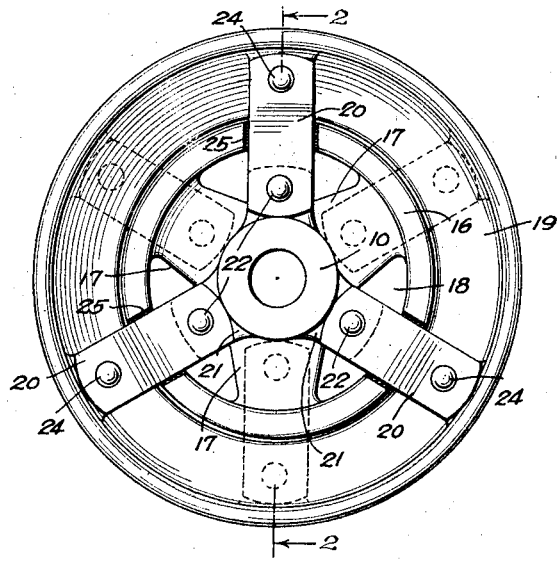
Figure 1 is a side elevation of a preferred embodiment of my new power wheel.
Figure 2:
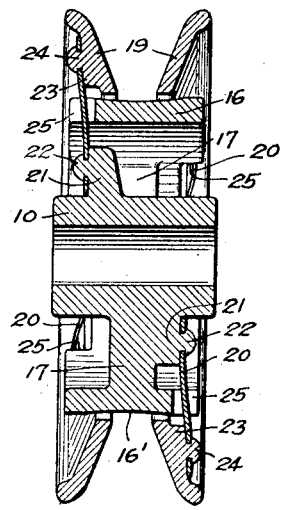
Fig. 2 is a vertical section on the line 2—2 of Fig. 1.

Referring now more particularly to the drawings, I show a wheel construction including a hub 10 adapted to be journaled on an axle 11 in the fork 12 of any suitable type of trolley pole 13 mounted upon a car 14 and coöperating with an electric wire 15. The hub indicated is conventional so far as the mounting in the fork is concerned, and hence the questions of lubrication and the transmission of the electricity from the hub through the pole do not enter into this consideration.

16 indicates a contact rim shown as slightly concave on its periphery 16′. The rim is preferably formed integral with the hub structure, being connected thereto by any suitable means such for example as a series of rigid spokes 17 indicated as three in number, and between each adjacent two of which there is provided a space 18. The contact rim 16 but for the slight concavity at 16′ is shown as approximately cylindrical on its periphery and of relatively great width, providing therefore a wide bearing or contact surface for the wire 15.

The two side flanges are indicated at 19 and are preferably duplicates. These flanges may vary somewhat in design but in the main are for the usual purpose, namely, to keep the trolley in contact with the wire. Instead however, of having the flanges fixed to the hub or contact rim as is the usual practice I provide means flexibly supporting the flanges for movement independent of each other upon the hub. The means I disclose for this purpose comprises a series of three springs 20 for each flange 19. These springs are indicated as of the leaf or flat type, the springs of each series being equally spaced circumferentially, and the springs of one series being staggered with respect to those of the other series. The hub is shown provided with two series of outwardly projecting lugs 21 against the outer faces of which the inner ends of the springs are secured as by means of rivets 22 or studs formed integral with the lugs 21 and adapted to be upset on the outer face of the springs. The outer ends of the springs are fixed against the outer faces of pillows 23 formed on the outer faces of the flanges. These pillows serve primarily as supports for the springs bringing the inner faces of the outer ends thereof approximately in the planes of the outer faces of the lugs 21, it being borne in mind that the cross section of each rim is arranged ordinarily at an oblique angle to the axis of the hub. The outer ends of the springs are fastened against the outer faces of the pillows by means of studs 24, or their equivalent, the same being shown as integral parts of the pillows and adapted to be upset on the outside of the springs.

Figure 3:
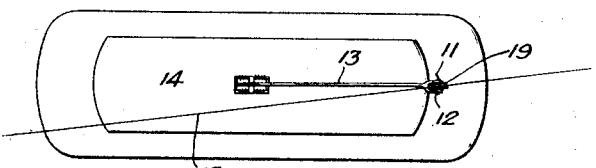
Fig. 3 is a diagram in plan indicating one of the many different angles that may be assumed between the trolley wire and the trolley pole, and so indicating the advantage of the flexible supports for the wheel flanges.

From the construction illustrated it will be noted that the rim 16 approximates a hollow cylinder, the ends of the cylinder extending materially beyond the width of the spokes and consequently beyond the planes of the outer faces of the lugs 21 and pillows 23. By this fact there are provided two essential advantages: First, a wide bearing surface is provided for the wire as previously stated, a matter of importance considering the flexibility of the flange supports and the adaptation thereof to move outward with respect to the central plane of the wheel perpendicular to the axis thereof. The projecting ends or edges of the rim 16 are provided with radially disposed notches 25 to accommodate the portions of the several springs intermediate of their ends. The circumferential width of each notch approximates the width of the springs, hence the second advantage of the wide contact rim is to provide positive means to hold the several flanges 19 from rotation with respect to the hub structure. The friction between the wire 15 and the side flanges is enormous when the car is making turns or crossovers and this friction would ordinarily tend to cause independent rotation of one or both of the flanges. The springs 20, however, are of ample weight and strength not only to carry the current from the wire through the flanges but also to withstand the strain to which they are subjected. The edges of the springs are adapted to impinge against the walls of the notches and so the flanges are positively held from independent rotation. While each flange is rigid and defines its own plane which by virtue of the springs is normally perpendicular to the axis of the hub and hence parallel to the plane of the other flange, it will be appreciated that when the wire is brought into diagonal position with respect to the axis of the wheel as indicated in Fig. 3 the flanges are spread apart by the wire. Or in other words the wire acting as a lever between oblique portions of the two flanges on the same side of the hub forces said two portions away from each other instead of slipping from the wheel. Since, however, the trolley wheel is rotating while the car is moving and the portions of the flanges diametrically opposite from the points of contact with the wire are caused to approach each other somewhat, it follows that the peculiar mounting or supporting means for the flanges provides that the wheel while the car is making a turn will cause the flanges to wabble around the axis of the wheel.

The side flanges 19 may be described as having free floating relation to the wide contact surface of the hub rim each over practically one-half of the rim surrounded thereby, so that while one portion or side of a flange may be forced laterally outward by twisting contact with the trolley wire the diametrically opposite portion of the same flange moves inward toward the center of the contact rim and beyond the normal position thereof. The fact that the central portion of the contact rim or that part which is normally engaged by the wire is not greater in diameter and preferably less than those portions surrounded by the flanges, insures this freedom of wabbling or floating action of the flanges.

Whereas trolley wheels in the solid form as usually made are subjected to intense heat in practice that has a tendency to interfere somewhat with the lubrication thereof, my improved wheel is of an open or skeleton structure and hence is so ventilated as to reduce the heating tendency thereof materially. There is, therefore, no serious likelihood that the temper of the springs will be destroyed in the practice of the invention.

I claim:

1. In a trolley wheel, the combination of a rotatable hub, a pair of side flanges rotatable therewith, and means flexibly supporting the flanges on the hub and serving to normally hold them in parallel planes perpendicular to the axis of the hub, but permitting the flanges to freely wabble independently of each other with respect to their normal planes under the influence of a trolley wire acting diagonally between and in direct contact with the flanges, the structure providing for the movement of either flange inward from normal position at one side, while the opposite side of the same flange is forced outward from normal position.

2. In a trolley wheel, the combination of a rotatable hub, a wide contact rim secured to the hub, the contact surface of the rim being of smaller diameter than its edges, a pair of side flanges loosely surrounding the contact rim and each being movable freely over the half of the contact rim surrounded thereby, and flexible supporting means for the flanges.

3. In a trolley wheel, the combination of a rotatable hub, a wide contact rim rigidly connected to the hub, a pair of side flanges surrounding the rim and movable freely thereover between the edges of the rim and connecting means between the flanges and the hub, the edges of the rim being notched and the connecting means for the rims coöperating in said notches to insure rotation of the flanges with the hub and rim.

JOSEPH LEFKOWITZ.